US010179595B2

(12) United States Patent
Carlson et al.

(10) Patent No.: US 10,179,595 B2
(45) Date of Patent: Jan. 15, 2019

(54) WORKER PROTECTION SYSTEM

(71) Applicant: Metrom Rail, LLC, Lake Zurich, IL (US)

(72) Inventors: Richard Carlson, Woodstock, IL (US); Kurt Gunther, Leland, IL (US); Sara Jo Woitel, Lake Zurich, IL (US); Marc Wayne Cygnus, Mundelein, IL (US); Peter Strezev, Apollo Beach, FL (US); John Albert Plutt, Jr., Chicago, IL (US)

(73) Assignee: METROM RAIL, LLC, Crystal Lake, IL (US)

( * ) Notice: Subject to any disclaimer, the term of this patent is extended or adjusted under 35 U.S.C. 154(b) by 210 days.

(21) Appl. No.: 15/078,427

(22) Filed: Mar. 23, 2016

(65) Prior Publication Data

US 2016/0280240 A1    Sep. 29, 2016

Related U.S. Application Data

(60) Provisional application No. 62/177,683, filed on Mar. 23, 2015.

(51) Int. Cl.
| | |
|---|---|
| *B61L 15/00* | (2006.01) |
| *B61L 23/06* | (2006.01) |
| *B61L 25/02* | (2006.01) |
| *G01S 19/17* | (2010.01) |

(52) U.S. Cl.
CPC .......... *B61L 23/06* (2013.01); *B61L 15/0027* (2013.01); *B61L 25/021* (2013.01); *B61L 25/025* (2013.01); *G01S 19/17* (2013.01); *B61L 2205/02* (2013.01); *B61L 2205/04* (2013.01)

(58) Field of Classification Search
CPC .......... B61L 23/06; B61L 23/34; B61L 25/02; G08B 1/08; G08B 13/2488; G08B 21/02; G08B 21/18; G08F 1/123; G08F 1/16; G08F 1/163; G08F 1/166
See application file for complete search history.

(56) References Cited

U.S. PATENT DOCUMENTS

| | | | | |
|---|---|---|---|---|
| 2,475,578 | A * | 7/1949 | Halstead ................. | B61L 23/00 362/88 |
| 2,762,913 | A * | 9/1956 | Jepson .................... | B61L 23/34 246/124 |
| 5,198,800 | A * | 3/1993 | Tozawa ................. | E02F 9/2033 212/276 |

(Continued)

OTHER PUBLICATIONS

International Search Report and Written Opinion for PCT/US2016/023754, dated Aug. 8, 2016. (10 pages).

*Primary Examiner* — Jason C Smith
(74) *Attorney, Agent, or Firm* — McAndrews, Held & Malloy, Ltd.

(57) ABSTRACT

Systems and methods are provided for worker protection. The worker protection systems comprise a plurality of alert devices, comprising one or more wearable personal alert devices, each worn by a person (e.g., worker), and one or more companion alert devices that broadcast alerts or signals triggering alerts. The companion alert devices comprise vehicle-mounted alert devices, configured for operation on vehicles (e.g., trains), and wayside detection units, configured for placement on or near paths of the vehicles. The wayside detection units may be operable to autonomously detect and track the vehicles.

30 Claims, 6 Drawing Sheets

(56) References Cited

U.S. PATENT DOCUMENTS

| | | | |
|---|---|---|---|
| 5,554,982 A * | 9/1996 | Shirkey | B61L 3/004 246/122 R |
| 5,620,155 A * | 4/1997 | Michalek | B61L 29/24 246/121 |
| 5,652,570 A * | 7/1997 | Lepkofker | A61B 5/1112 340/407.1 |
| 5,727,758 A * | 3/1998 | Penza | B61L 23/06 246/124 |
| 5,924,651 A * | 7/1999 | Penza | B61L 23/06 246/124 |
| 5,939,986 A * | 8/1999 | Schiffbauer | B66C 15/045 299/12 |
| 6,113,037 A * | 9/2000 | Pace | B61L 23/06 246/124 |
| 6,145,792 A * | 11/2000 | Penza | B61L 3/125 246/122 R |
| 6,208,260 B1 * | 3/2001 | West | B66C 15/06 340/5.1 |
| 6,232,887 B1 * | 5/2001 | Carson | B61L 23/06 340/4.21 |
| 6,650,242 B2 * | 11/2003 | Clerk | F16P 3/144 340/425.5 |
| 7,167,082 B2 * | 1/2007 | Stigall | A41D 13/00 340/407.1 |
| 7,624,952 B1 * | 12/2009 | Bartek | B61L 23/06 246/124 |
| 8,109,474 B2 * | 2/2012 | Bartek | B61L 1/02 246/124 |
| 8,248,263 B2 * | 8/2012 | Shervey | F16P 3/147 340/539.1 |
| 8,344,877 B2 | 1/2013 | Sheardown et al. | |
| 8,786,428 B2 * | 7/2014 | Sheardown | B61L 23/06 246/122 R |
| 8,952,805 B2 * | 2/2015 | Baines | G08B 21/02 340/539.12 |
| 2010/0102954 A1 * | 4/2010 | Radivojevic | G01S 11/06 340/539.11 |
| 2011/0006912 A1 * | 1/2011 | Sheardown | B61L 23/06 340/901 |
| 2011/0152971 A1 * | 6/2011 | Nghiem | A61N 1/37229 607/60 |
| 2012/0296562 A1 * | 11/2012 | Carlson | B61L 15/0027 701/301 |
| 2013/0166114 A1 * | 6/2013 | Baines | B61L 23/06 701/20 |
| 2014/0045547 A1 * | 2/2014 | Singamsetty | G06F 1/1643 455/552.1 |
| 2016/0280240 A1 * | 9/2016 | Carlson | G01S 19/17 |
| 2017/0282944 A1 * | 10/2017 | Carlson | B61L 15/0027 |

* cited by examiner

WORKER PROTECTION SYSTEM

CLAIM OF PRIORITY

This patent application makes reference to, claims priority to and claims benefit from U.S. Provisional Patent Application Ser. No. 62/177,683, filed Mar. 23, 2015. The above identified application is hereby incorporated herein by reference in its entirety.

TECHNICAL FIELD

Aspects of the present disclosure relate to safety solutions particularly in conjunction with railway systems. More specifically, various implementations of the present disclosure relate to methods and systems for worker protection.

BACKGROUND

Various issues may exist with conventional approaches for worker protection in conjunction with railway systems. In this regard, conventional systems and methods, if any existed, for worker protection in conjunction dangers posed by work on or near tracks, can be costly, inefficient, and/or ineffective. Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

System and methods are provided for enhanced worker protection, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE INVENTION

As utilized herein the terms "circuits" and "circuitry" refer to physical electronic components (e.g., hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y, and z." As utilized herein, the term "exemplary" means serving as a non-limiting example, instance, or illustration. As utilized herein, the terms "for example" and "e.g." set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

Figure 1A:
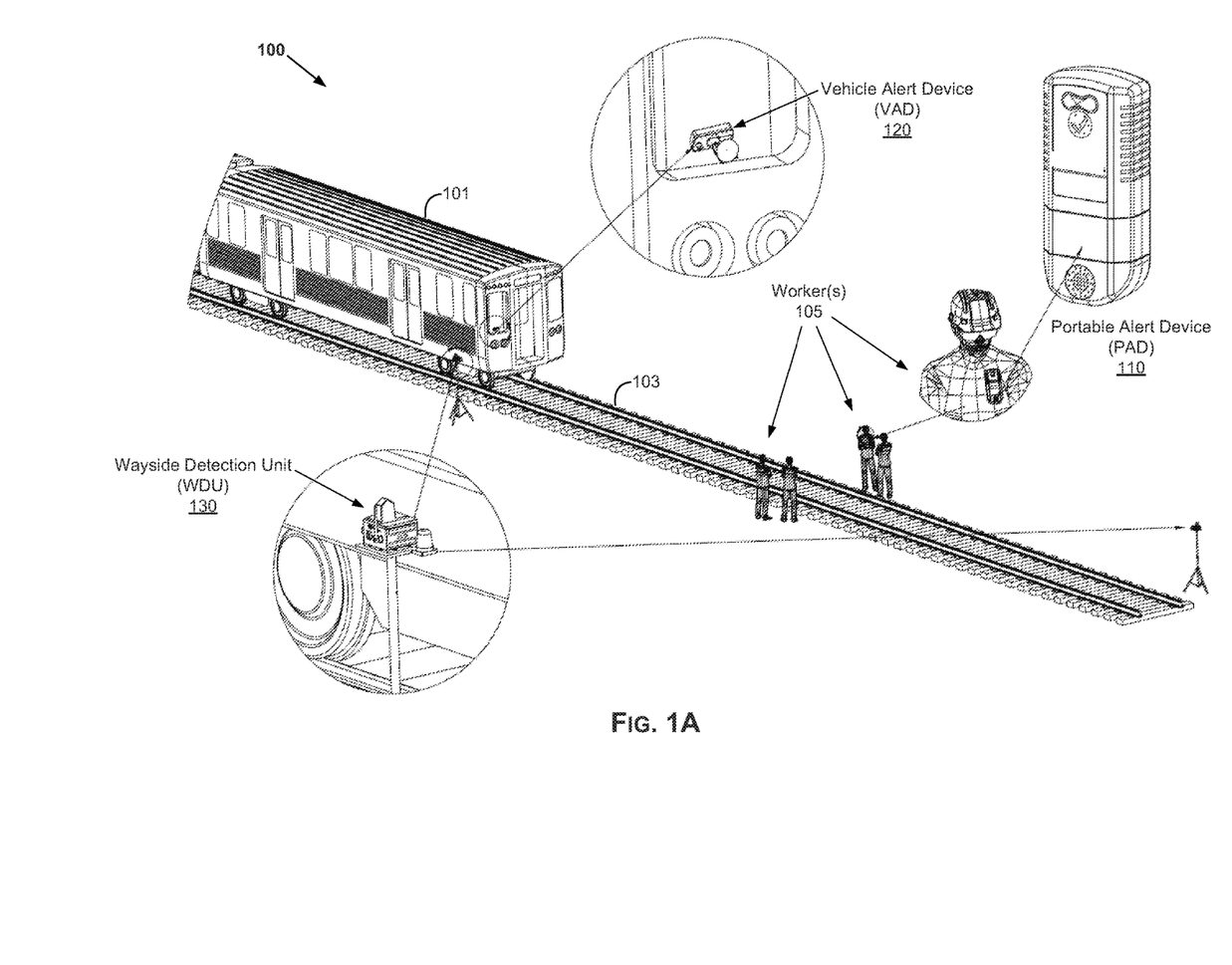
FIG. 1A illustrates an example work protection system, in accordance with the present disclosure.

FIG. 1A illustrates an example work protection system, in accordance with the present disclosure. Shown in FIG. 1A is a worker protection system 100, which may be used in providing and/or enhancing workers safety, particularly with regard to dangers posed by trains in railway work environments.

The worker protection system 100 is a proximity warning system operable to issue alerts (e.g., to railroad worker(s) 105) when a particular vehicle (e.g., a train 101) is approaching. In this regard, the worker protection system 100 comprises one or more devices or components, each comprising suitable hardware (including, e.g., circuitry), software, or any combination thereof configured for supporting worker protection related operations or functions.

For example, the worker protection system 100, as shown in FIG. 1A, comprises one or more wearable devices, referred to as portable alert devices (PADs) 110, which are worn by worker(s) 105. The PADs 110 communicate with one or more companion devices, which are configured to directly trigger (and transmit to the PADs 110) alerts, or transmit signals causing issuing of alerts by the PADs 110. The companion devices comprise vehicle-mounted companion devices, referred to as vehicle alert devices (VADs) 120, mounted on vehicles (e.g., the train 101) that may pose danger to the workers, and/or stand-alone devices that are placed in "wayside" manner—that along or near path of the approaching object (e.g., track 103 traversed by the train 101), referred to wayside detection units (WDUs) 130, which are portable devices placed by the workers 105 at the work site. The VAD 120 is configured to trigger alerts under particular conditions—e.g., when it detects it is approaching a crew equipped with the corresponding wearable devices (PADs 110). The VAD 120 may also be configured to alert the vehicle operator—that workers are in proximity, and may provide additional information in this regard (e.g., display the number of detected workers, indicate distance to workers, indicate whether workers have confirmed the alarm, etc.). Similarly, the WDU 130 is configured to trigger alerts under particular conditions, such as when it detects the approaching vehicle (the train 101). In this regard, the WDU 130 may be used when no VADs 120 are being used, or even when VADs 120 are utilized, such as to provide redundant warning capabilities with additional range.

The PAD 110 may be designed and configured as small and light device, with low profile so as not to impede normal working activities of the worker(s) 105 wearing it. For example, the PAD 110 may be worn by either a clip, arm band or belt clip. The PAD 110 is operable to issue an indication (e.g., audio, visual, tactile, etc.) to alert the worker wearing it of an approaching object (that pose a safety concern). For example, the PAD 110 may comprise audio warning component (e.g., a speaker), a visual warning component (e.g., a multi-color LED indicator), tactile indicator component (e.g., vibration), etc. Further, the PAD 110 may be operable to enable the user to provide feedback in response to issued alarm indication. For example, the PAD 110 may comprise an alert acknowledgement element, such as a confirmation button to silence alarms (i.e., a "mute" or "confirm" switch). To improve and optimize wearability of the PAD 110, its housing may be designed to include various features to support multiple mounting locations and/or approaches (e.g., clipped on the user's clothing/equipment, around the user's wrist, etc.). The PAD 110 may be configurable to provide alerts adaptively based on particular pre-set conditions—e.g., to provide at least a 15 second warning in line of sight conditions, when a train is approaching at 60 mph.

The VAD 120 may be configured either as a portable device (e.g., brought into and that may be mounted to vehicles only when needed), or as permanently mounted or integrated component (of vehicles). Implementing the VAD 120, which typically is the most costly component of the system, as a detachable device may be desirable as it allows use of small number of the VADs 120, being only moved into and used on vehicles being operated, thus reducing the deployment cost significantly. The VAD 120 may be operable to broadcast signals that are specifically configured to interfaces with the wearable devices (PADs 110) and may also interface with the wayside unit (WDU 130) to provide increased distance. Further, in some instances the VAD 120 may be operable to, when worker(s) is/are detected, provide indication to the operator(s) of the vehicle, such as by displaying and/or sounding warnings. In some instances, the VAD 120 may provide detailed information (rather than generic warning), such as indicating the quantity of workers detected, and the approximate distance to the workers.

Figure 1B:
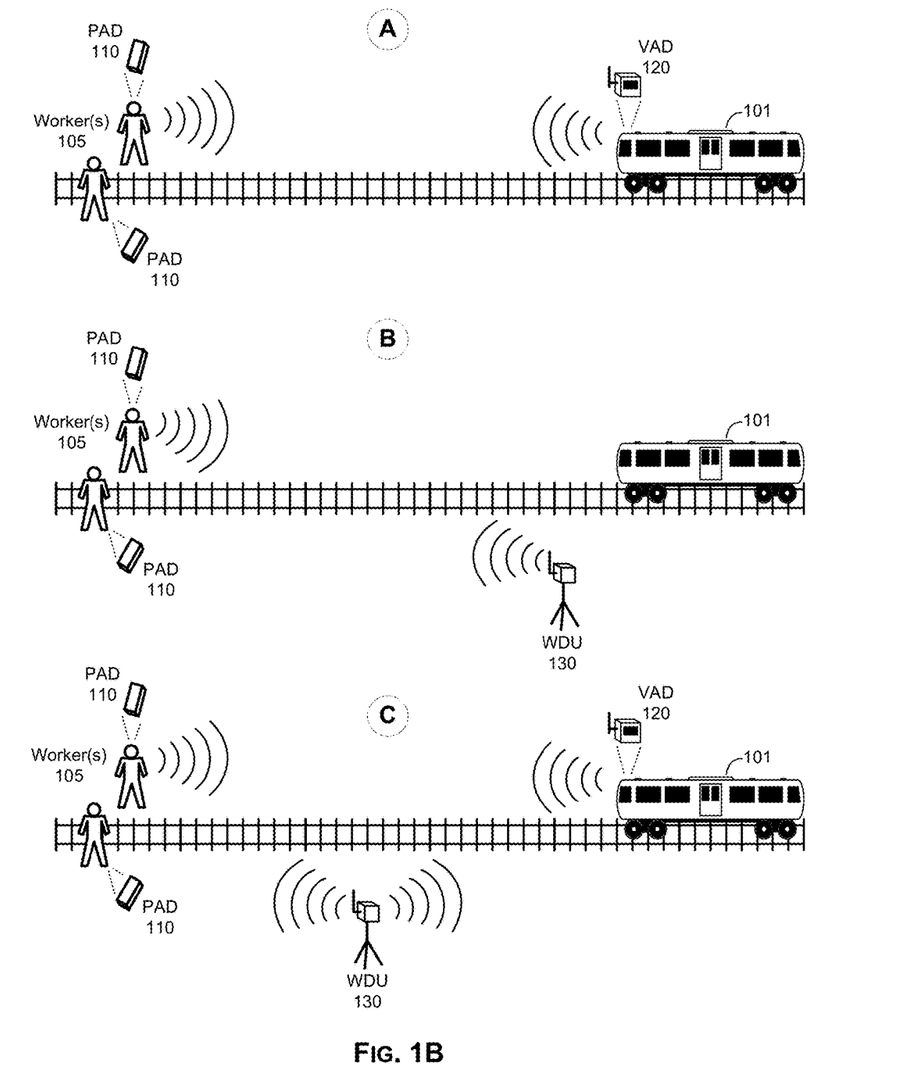
FIG. 1B illustrates example use scenarios of a work protection system, in accordance with the present disclosure.

While the VAD 120 is illustrated in FIGS. 1A and 1B as a singular physical component, incorporating all components (including antennas), the disclosure is not so limited, and in some instances VADS may be implemented to support distributed arrangements—e.g., comprising a plurality of physical units, which may be placed at different locations or positions within the vehicles. For example, VADs may comprise a first physical unit comprising the antennas (and related circuitry or other support components), and one or more other physical units housing the remaining components of the VADs. In this regard, the physical antenna unit may be configured for optimal placement (e.g., on roof of front car in train) which may be deemed optimal based on one or more placement criteria (e.g., optimal broadcast characteristics, maximum safety to operators and other individuals on train, such as passengers, etc.).

The WDU 130 is configured to operate as stand-alone device, placed on or near the path of the object(s) being detected. For example, the WDU 130 may be attached to placement component (e.g., a tripod), and is temporarily placed near the track 103. The placement of the WDU 130 may be subject to particular criteria—e.g., no closer than certain distance (for example, four feet) to the nearest rail, at or in advance of each end of a work zone. The WDU 130 broadcasts a signal when a train or vehicle passes. The WDU 130 may have dual functionality as it may interface with the VAD while also broadcasting signals to PADs. The WDU 130 may be utilized in areas where trains or other vehicles may not have vehicle mounted companion devices (e.g., VADs 120). Nonetheless, the disclosure is not so limited, and in some instances all three types of devices may work together, as described below.

In certain implementations, worker protection systems in accordance with the present disclosure, such as the worker protection system 100, may incorporate various solutions for providing worker alerts (particularly, e.g., for railway work environments) in enhanced and adaptive manner. For example, worker protection system 100 may be configured to trigger alerts based on speed, at least in part, rather than simply based on distance between workers and approaching trains. In this regard, the worker protection system 100 may be configured to utilize the approach speed to appropriately time to the alert so that the alerts are not triggered too late, but also are not triggered too early causing the workers 105 to start ignoring and suppressing alerts (e.g., on very slow moving or stationary vehicles), until the vehicle is actually a potential threat. Thus, the distance at which the alerts are triggered may be based on the speed of the vehicles. For example, for trains approaching at speeds under 4 mph, no alerts are triggered until the train is within 100 feet, whereas for a train approaching at 30 mph the alerts are triggered when the train is with 1000 feet. In this regard, the conditions at which the alerts are triggered (e.g., speed, distances, or combinations thereof) may be configurable.

Various aspects of the alert related operations (triggering criteria) and/or associated functions (e.g., logging) may be location-dependent. As such, worker protection systems in accordance with the present disclose (e.g., the worker protection system 100) may support use of positioning solutions (e.g., Global Navigation Satellite System (GNSS) technologies, such as GPS, GLONASS, Galileo, etc.), to enable obtaining location/positioning information that may be used in alert related operations or functions. This may be done by incorporating into the various devices (e.g., the PADs 110, the VADs 120, and the WDUs 130) dedicated GNSS resources (e.g., receivers, antennas, etc.) and/or by configuring them to use existing GNSS resources where possible (e.g., use of existing positioning application in the train 101 by the VAD 120).

The alerts may be triggered only when a preset (programmed) alert trigger threshold is satisfied (e.g., vehicle's speed exceeding particular limit, distance to workers falling below particular value, etc.). In certain implementation, multiple threshold types may be used. For example, in one example implementation, three alert threshold types may be used: time-to-arrival (TTA), distance-from-train (DFT), and low-speed close proximity distance alert (CPD). These different types of thresholds may be applicable at different conditions. For example, at low speeds, below a configurable speed threshold, the workers will not get TTA or DFT alerts; rather, the alert triggering is held off until the train/vehicle comes within a programmed short distance. This may avoid triggering DFT alert prematurely (time-wise), when it still might be a long time (e.g., minutes) until the train arrives due to its low speed.

In certain implementations, worker protection systems in accordance with the present disclosure, such as the worker protection system 100, may support location-specific rule customization. For example, an operator (e.g., a transit agency) may desire modified alerting rules at particular areas/locations (e.g., due to unique geography, or greater difficulty in seeking safe shelter, etc.). Thus, alert devices that are intended for use in such areas/locations may be reconfigured dynamically. This may be done by use of (re-)customization stations at entry points to those areas/locations, to reconfigure the alert devices dynamically. This may be done using near field communication rule modification. The alert units may be placed in proximity to the customization stations briefly, and the rules are then updated. Further, indications (e.g., visual, audible, etc.) of successful (or failed) rule changes may be provided. In some instances, the special/customized rules may be configured to expire, such as after a certain period of time, after next power down or charging cycle, etc.

In certain implementations, worker protection systems in accordance with the present disclosure, such as the worker protection system 100, may be configured to provide alerts for both the vehicle operator as well as all workers. The worker protection system 100 may be configurable based on user preferences and/or parameters. For example, the worker protection system 100 may be configured to operate (trigger alerts) within operator-configurable combinations of distances, speeds, location, etc. Further, the PADs 110 may be customized to operate according to individual organizations' rules and regulations.

In certain implementations, worker protection systems in accordance with the present disclosure, such as the worker protection system 100, may be operable to allow assignment and/or unique identification of vehicle-mounted units (i.e., VADs 120), such that the wearable units (PADs 110), as well as the wayside units (WDUs 130) would only respond to alerts corresponding to particular tracks. In other words, each VAD 120 would be identified uniquely, and assigned to a particular track, to enable only PADs 110 and/or WDUs 130 used by workers on that particular track to respond to alerts triggered by that VAD 120, while ignoring other VADs 120 (thus avoiding false alerts).

In certain implementations, worker protection systems in accordance with the present disclosure, such as the worker protection system 100, may be configured to provide optimized power performance (e.g., power supply, power consumption, etc.). In this regard, the power supply may be adaptively selected and/or configured for each of different devices in the worker protection system 100, based on the type and/or working conditions for the device. For example, the PAD 110 may be powered using integrated power supply (e.g., batteries or similar power sources). In this regard, rechargeable batteries may be used, allowing the recharging of the device when not in use (e.g., being inserted or docked into charging stations at the end of each day to be charged for work the following day. The VAD 120 may be powered by the vehicle to which it is mounted or integrated. The WDU 130 may be powered using integrated power supply (e.g., batteries or similar power sources), which may be rechargeable.

Further, certain solutions may be incorporated and/or used to enhance overall power consumption. For example, the PAD 110 may be configured to support one or more power-saving modes (e.g., modes with the PAD 110, or at least some of the components thereof, transitioning to low functionality states, or completely shutting down). The PAD 110 may be operable to facilitate transitioning back to full functionality (or powering up) when necessary. For example, the PAD 110 may be configured to automatically shut down when it is not being used (e.g., when placed in a charger or docking bay for recharging). Further, the PAD 110 may be operable to dynamically determine when to transition to (or from) power saving modes. For example, the PAD 110 may comprise a component (e.g., accelerometer) for determining when the device is idle for an extended period of time, and respond to that by entering power saving mode (e.g., shut down, or operate with less frequent polling). Such accelerometer detects the lack of motion for a period of time to enter the power-saving mode; then trigger return to normal operating mode when movement is detected.

In certain implementations, worker protection systems in accordance with the present disclosure, such as the worker protection system 100, may be configured to provide logging and data recording. The logging and data recording may be used, for example, for training, for location tracking, and/or for even recreating (e.g., during accident investigation). For example, the PAD 110 may comprise circuitry for data recording and/or logging—e.g., to compile downloadable log files, which may be accessible (remotely, such as via any available communication means, or by direct connection to the PAD 110, such as when the device is docked for recharging). Such log files are then available to allow examination of alerts as well as related events and/or activities (e.g., users' responses, such as alert silencing actions). The VADs 120 and/or the WDUs 130 may similarly be configured to support logging of worker protection/alert related information, such as by also compiling downloadable log files that are available when needed. The log files may contain data recording triggered alerts and related information (e.g., alerts' times and/or location, distances to workers and traveling speed within work zone workers' acknowledgment or response actions, etc.), as well as other information relating to, e.g., faults, mechanical shock over thresholds, etc. Further, logs may include GPS positioning information (e.g., coordinate of locations of alerts), time of events, compass bearing, received signal strength, and antenna used, when available.

In certain implementations, worker protection systems in accordance with the present disclosure, such as the worker protection system 100, may be incorporate various communication techniques for optimizing performance, with respect to the broadcast, reception, and processing of signals used in triggering alerts. For example, the PAD 110 may incorporate diversity antennas of identical or differing polarity, to improve signal reception reliability. Use of such diversity antennas (with corresponding signal processing functions) allows for improved performance in certain conditions, such as when the worker 105 is not in the optimal position of antenna orientation.

In certain implementations, worker protection systems in accordance with the present disclosure, such as the worker protection system 100, may be configured to provide backward compatibility with existing protection solutions and/or protocols. Further, it may be particularly designed and implemented such that it may be integrated into future communications based train control systems.

In certain implementations, multiple devices in worker protection systems in accordance with the present disclosure, such as the worker protection system 100, may be configured to operate collaboratively, to ensure that alerts are received by all workers. For example, the PADs 110 and/or the WDUs 130 may be configured to relay alerts (e.g., of approaching trains) to other devices nearby, thus improving the field strength of warning signals, by increasing the probability that all nearby PADs 110 receive the alert (even devices that may have not been able to receive the signals/alerts directly).

The various devices (PADs, VADs, WDUs) used in the worker protection systems may be designed and/or implemented to meet certain operational requirements (relating to, e.g., shock/vibration, temperature/humidity, salt conditions, icing, hose down, electrostatic discharge (ESD), electromagnetic compatibility (EMC), electromagnetic interference (EMI), electromagnetic compatibility, etc.) in accordance with particular standards that may be pertinent to the related industries (MIL-STD-810, AREMA 11.5.1, IEC 61000-4, SAE J1113, CISPR 22, FCC Title 47, Association of American Railroads (AAR) All Applicable AAR S-9401, etc.).

Accordingly, worker protection systems in accordance with the present disclosure, such as the worker protection system 100, with many of the components being portable and/or configurable, offer portability and ease of configuration, allowing them to be set up in any work environment seamlessly.

FIG. 1B illustrates example use scenarios of a work protection system (e.g., the work protection system 100 of FIG. 1A), in accordance with the present disclosure. In this regard, the different use scenarios may be based on which of and how the different devices in the work protection system 100—that is the PADs 110, the VADs 120, and the WDUs 130—interact during operation of the system, to provide the intended protection.

For example, in a first use scenario (denoted as 'A' in FIG. 1B), only worker wearable devices (PADs 110) and vehicle-mounted devices (VADs 120) are used—i.e., no wayside devices (WDUs 130) are used. In other words, as shown in FIG. 1B, the train 101 is equipped with a VAD 120, which broadcasts signals to interface with the PADs 120 worn by worker(s) 105, to detect if the train 101 is in proximity where an alarm is activated. In this regard, the PADs 120 will issue an alert (e.g., audible alarm) once they are detected by any train-based VAD 120, such as within a specified distance. On the vehicle side, the VAD 120 may further provide information to the operator when the PADs 120 are detected. For example, a user interface may indicate such information as how many PADs 120 (and thus worker(s) 105) are present within the specified distance. Further, the workers and/or operators may respond to issued alarms—e.g., silencing them, such as by acknowledging them on the wearable devices and/or on the user interface of the vehicle mounted devices.

In a second use scenario (denoted as 'B' in FIG. 1B), no vehicle-mounted devices (VADs 120) are used; rather, the worker wearable devices (PADs 110) are only in communication with the wayside devices (WDUs 130). In this regard, the wayside devices monitor for and detect approaching vehicles (e.g., the train 101), broadcast alarms (or signals triggering alarms) when a vehicle is in proximity (e.g., determined when at particular distance from the wayside device and/or moving at particular speed). For example, when the train 101 is detected by the WDU 130 (e.g., when it passes it, or moves within certain distance from it, at particular speed), it sends a proximity warning to all local PADs 110. Once the alarms is triggered at the wearable devices, they may continue until acknowledged by the workers—e.g., audible alarms continue until silenced, such as by hitting a "confirm" button.

In a third use scenario (denoted as 'C' in FIG. 1B), all three types of devices—that is worker wearable devices (PADs 110), vehicle-mounted devices (VADs 120) and wayside devices (WDUs 130)—are used, and may communicate with one another to provide the desired protection. In such scenarios, a worker wearable device may be activated and/or triggered by vehicle-mounted devices as well as wayside devices, for redundancy (thus enhanced protection). For example, the train 101 may be equipped with the VAD 120, which may communicate directly with the WDU 120 as the train 101 approaches it, such as when the train 101 is at a specified distance. In response, the WDU 130 may send proximity warnings (trigger alarms) to all local PADs 110. Under certain conditions (e.g., at particular distance and/or speed), the VAD 120 may communicate directly with the local PADs 110, to trigger alarm (which may be configured differently, such as for heightened risk).

Figure 2A:
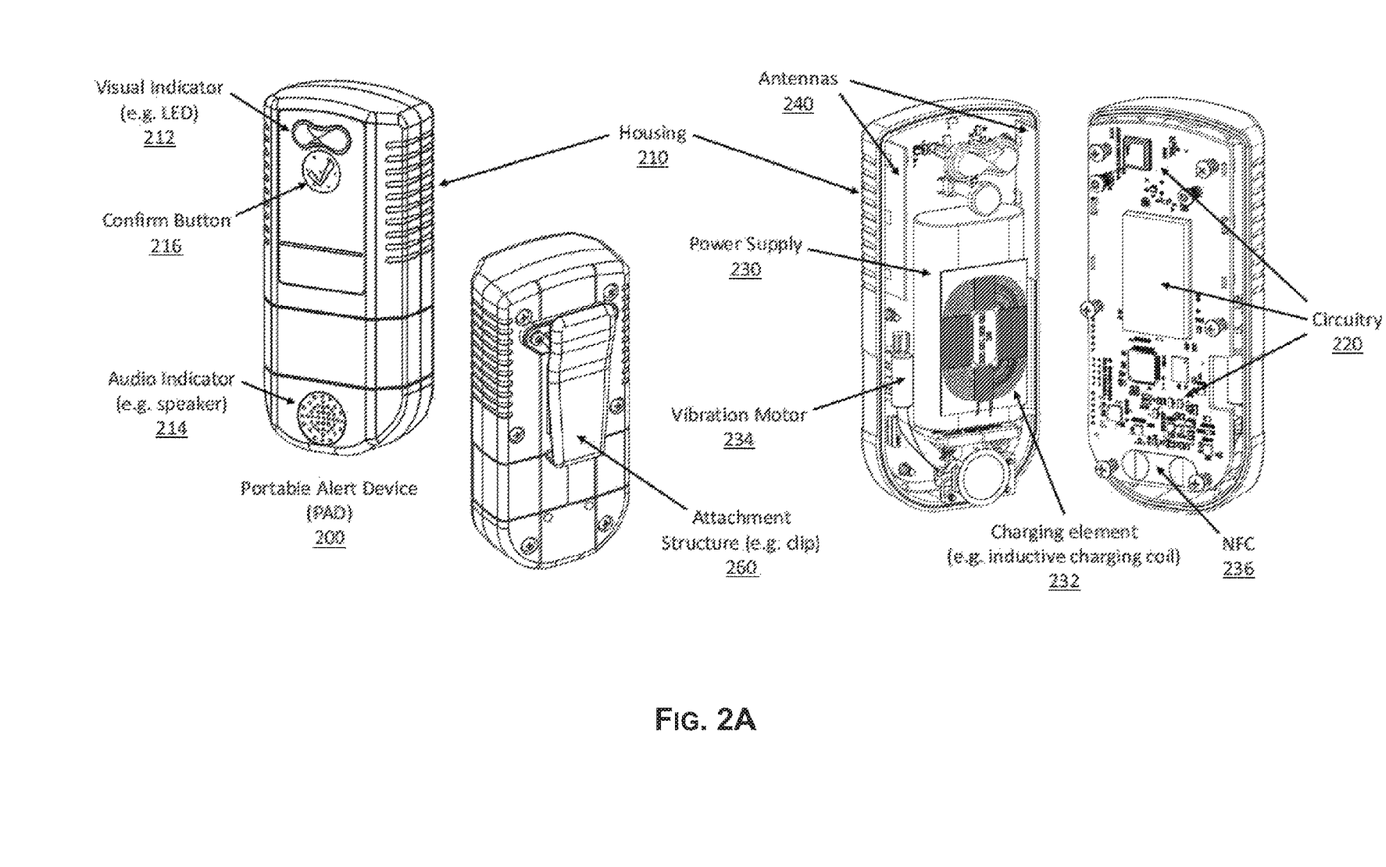
FIG. 2A illustrates an example portable alert device (PAD), in accordance with the present disclosure.

FIG. 2A illustrates an example portable alert device (PAD), in accordance with the present disclosure. Shown in FIG. 2A is a portable alert device (PAD) 200.

The PAD 200 may comprise suitable one or more of hardware (including circuitry and/or other hardware components), software, and combination thereof for implementing various aspects of the present disclosure, particularly with respect to the support of portable wearable functionality in worker protection solutions, as described above. The PAD 200 may be a particular example implementation of the PAD 110, as described with respect to FIGS. 1A and 1B. In this regard, as noted above PADs may be configured as portable devices that are wearable by users (e.g., workers) to provide alerts regarding approaching vehicles that may pose safety threats to workers at particular locations. The PAD 200 is operable to perform such functions, in support of work protection systems in accordance with the present disclosure, as receiving alerts (or triggering alerts in response to broadcast warning signals) and providing alert indications to the user (the worker wearing the device), as well as additional alert related functions, such logging alert related data, etc.

In the example implementation illustrated in FIG. 2A, the PAD 200 may comprise a housing 210 for enclosing various components of the PAD 200. The housing 210 may be constructed to be suitable for the intended operations (and environment and/or conditions thereof) of the PAD 200 (e.g., strong enough to withstand harsh work environment but light enough as to not encumber the worker or hinder his/her activities), and to withstand environmental conditions associated with outside/external use (e.g., rain, extreme cold/heat), etc.).

The PAD 200 may comprise (or may be integrated with) an attachment structure 260, for facilitating the wearability of the PAD 200, by enabling the PAD 200 to be attached to the worker and/or to item used by the worker (e.g., clothing, equipment, etc.). In this regard, the PAD 200 may support various types of attachment structures, to allow worker to select preferable way for apply the device. For example, as shown in FIG. 2A, the PAD 200 may comprise or be coupled to a clip structure 260, so that the PAD 200 may be clipped onto the worker's clothing, belt, etc. In another implementation (not shown), the PAD 200 may comprise or be coupled to a strap structure, so that the PAD 200 may be attached around the worker's wrist.

The PAD 200 has one or more antennas 240, which may be integrated or enclosed within the housing 210, configured for transmitting and/or receiving signals (e.g., broadcast alert related signals). As noted above, PADs may support use of various optimization techniques, including use of diversity, and as such the antennas 240 may comprise diversity antennas of identical or differing polarity.

The PAD 200 may have an integrated/internal power supply 230, for powering the various components of the PAD 200. In this regard, the power supply 230 may be rechargeable. For example, charging stations (an example of which is described with respect to FIG. 2B) may be used. The recharging of the power supply 230 may be done in various ways, including by use of charging stations (an example of which is described with respect to FIG. 2B) for example. In this regard, the PAD 200 may be connected (e.g., coupled, inserted, docked, etc.) to the charging station when it is not being used (e.g., at the end of each day) to be charged.

The PAD 200 may comprise suitable circuitry 220 for performing various operations in support of its functions. For example, the circuitry 220 may be operable to store data (including code); run and/or execute various applications and/or functions (alert related); handle transmission and/or reception of signals (and processing transmitted and/or received signals); provide power management; manage logging operations in the PAD 200; and handle input/output functions (e.g., supporting different forms of alert indications, including visual, audio, and/or tactile, and handling user input, such as acknowledges of alerts).

As shown in FIG. 2A, the PAD 200 comprises a visual indicator (e.g., LED) 212 and an audio indicator (e.g., speaker) 214, which are integrated into the housing 210, and are configured to provide visual and/or audio indication in response to triggering of alerts. Also, within the housing 210, the PAD 200 comprises a vibration motor 234, which may be configured to cause vibrations in response to triggering of alerts. The PAD 200 may be configured to use one or more of available indications means—e.g., one or more of visual, audio, and tactile indications. This may be done based on pre-set criteria, user selected preferences, dynamic configuration of the device, etc.

Further, as shown in FIG. 2A, the PAD 200 comprises a confirmation button 216, which is configured to receive indication of user acknowledgment (e.g., by pressing the confirmation button 216), when alert indication(s) is/are outputted. In some instances, the PAD 200 may, in response to receiving user confirmations, generate and transmit acknowledge messages, to other alert devices (e.g., PADs, WDUs, and/or VADs broadcasting and/or forwarding signals triggering alerts that were confirmed).

In some example implementations, PADs in accordance with the present disclosure (such as, e.g., the PAD 200) may not have any openings for connectors or the like (for enhanced rigidity and/or protection against the elements). The functions of the PADs may be configured to account for and/or accommodate such design.

For example, only wireless communications are used such as using near field communications (NFC), for communication of data, and charging of the power supply is performed indirectly, such as using magnetic induction. Thus, as shown in FIG. 2A, the PAD 200 comprises a NFC component 236 for supporting NFC transmission and/or reception. Further, the PAD 200 comprises a charging element 232, for enabling (re)charging the power supply 230 in connectless manner—e.g., without requiring plugging a power cord or other wired cabling. The charging element 232 may comprise an inductive charging coil, for example. The PAD may also include an environmentally sealed button to allow the operator to perform alarm confirmation and silencing.

Figure 2B:
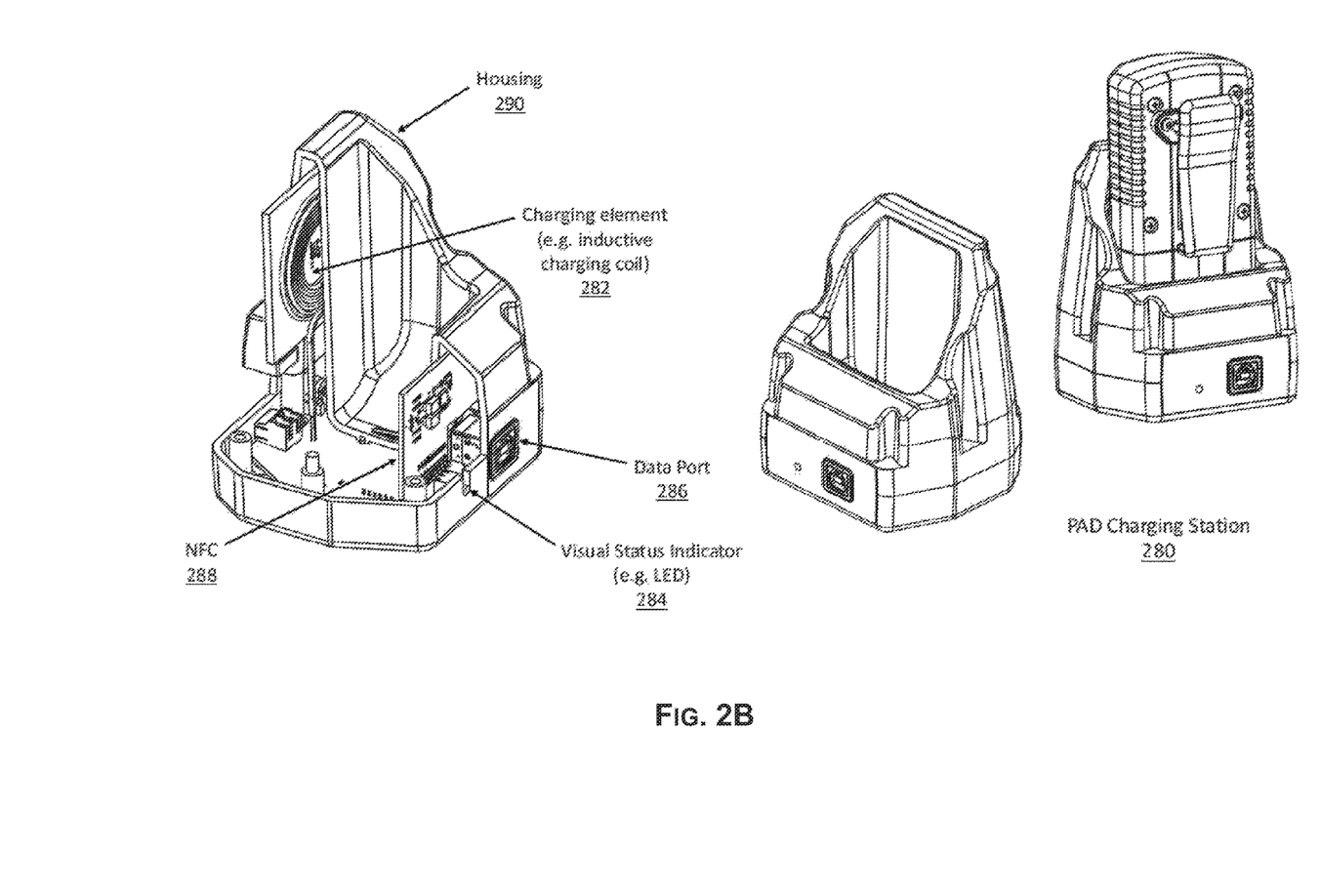
FIG. 2B illustrates an example charging station for use in conjunction with portable alert devices (PADs), in accordance with the present disclosure.

FIG. 2B illustrates an example charging station for use in conjunction with portable alert devices (PADs), in accordance with the present disclosure. Shown in FIG. 2B is a PAD charging station 280, which may be used in conjunction with portable alert devices (PADs), such as the PAD 200 of FIG. 2A.

The PAD charging station 280 may comprise suitable one or more of hardware (including circuitry and/or other hardware components), software, and combination thereof for implementing various aspects of the present disclosure, particularly with respect to the support of portable alert devices (PADs). In this regard, the main function of the PAD charging station 280 may be (re)charging PADs (e.g., the PAD 200 of FIG. 2A). The PAD charging station 280 may support additional functions, however. For example, the PAD charging station 280 may support and/or facilitate exchange of data with the PADs, such as to enable extraction of data from the PADs (e.g., log files) and/or input of data into the PAD (e.g., (re)configuration data), etc.

As shown in the example implementation illustrated in FIG. 2B, the PAD charging station 280 may comprise a housing 290 for enclosing various components of the PAD 200. The housing 290 may be constructed to be suitable for intended uses and/or functions of the PAD charging station 280. For example, the housing 290 may be configured such that it defines a space into which the supported PADs (e.g., the PAD 200 of FIG. 2A) may be inserted and/or docked.

The PAD charging station 280 may comprise various components for supporting and/or enabling charging power supplies of supported PADs. In this regard, the PAD charging station 280 (and charging related components thereof) may be configured to facilitate the charging in the manner required by the supported PADs. For example, in the example implementation illustrated in FIG. 2B, the PAD charging station 280 comprises a charging element 282 integrated within the housing 290, and configured for supporting recharging in connectless manner. The charging element 282 may comprise an indicative charging coil, for example, for enabling (re)charging by induction.

The PAD charging station 280 may comprise a data port 286 for extracting data from and/or inputting data into the PADs, while docked into the PAD charging station 280. Further, the PAD charging station 280 may comprise suitable communication circuitry for facilitating the actual exchange of data with the docked PADs. For example, the data exchanges may be done via near field communication (NFC) connections, and as such the PAD charging station 280 may comprise an NFC component 288 for supporting such communications.

In some instances, the PAD charging station 280 may comprise input and/or output (I/O) component for use in conjunction with operations of the PAD charging station 280. For example, the PAD charging station 280 may comprise a visual status indictor (e.g., LED) 284, integrated within the housing 290, to provide useful feedback (e.g., indication when charging, data extraction, data input, etc. is complete).

Figure 3:
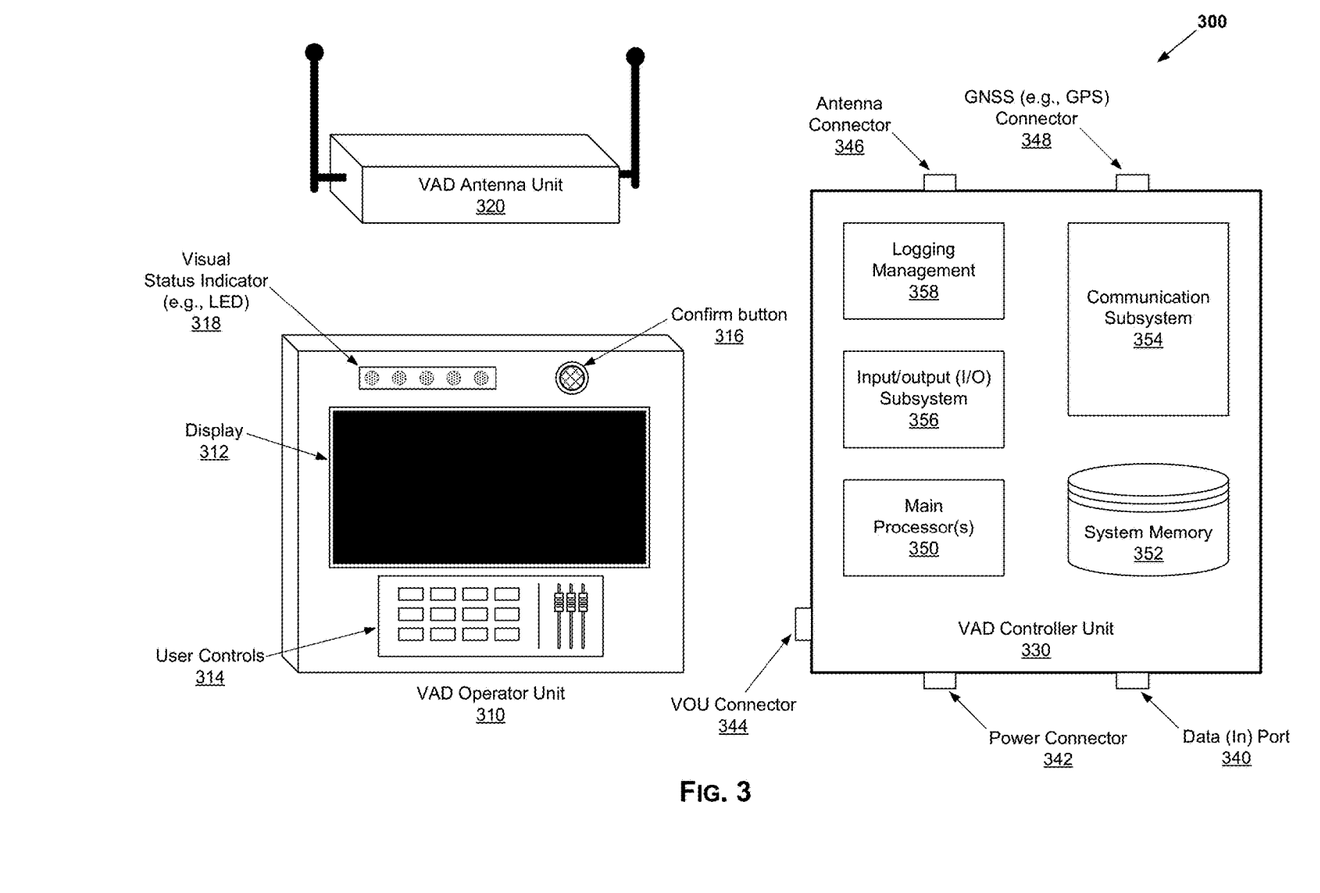
FIG. 3 illustrates an example vehicle alert device (VAD), in accordance with the present disclosure.

FIG. 3 illustrates an example Vehicle Alert Device (VAD), in accordance with the present disclosure. Shown in FIG. 3 is a vehicle alert device (VAD) 300.

The VAD 300 may comprise suitable one or more of hardware (including circuitry and/or other hardware components), software, and combination thereof for implementing various aspects of the present disclosure, particularly with respect to the vehicle-mounted functionality in support of worker protection. The VAD 300 may be a particular example implementation of the VAD 120, as described with respect to FIGS. 1A and 1B. In this regard, as noted above VADs may be configured as portable (movable) devices or as permanent components integrated into vehicles. The VAD 300 is operable to perform such functions, in support of work protection systems in accordance with the present disclosure, as broadcasting signals configured for interfacing with wearable devices (e.g., PADs 100), as well as additional alert related functions, such alert-related interactions with vehicle operators (e.g., to indicate when worker(s) is/are detected, for example by sounding a warning and/or providing a visual indicators, and/or displaying related information, such as the quantity of workers detected, and the approximate distance to the workers), logging alert related data, etc.

While VADs may be implemented as singular devices (that is within a single housing incorporating and/or attaching all components of the VAD), in some implementations, such as the example implementation illustrated in FIG. 3, VADs may be implemented in a distributed manner—e.g., comprising a plurality of physical units, each of which may be placed at particular location and/or position, selected for optimal performance with respect to functions and/or operations provided by that unit. For example, as shown in FIG. 3, the VAD 300 may comprise a VAD operator unit 310, a VAD antenna unit 320, and a VAD (main) controller unit 330.

The VAD operator unit 310 may comprise components for supporting interactions with the vehicle operator—e.g., to received user input and/or provide user feedback relating to operation of the VAD 300 and/or to alerts. For example, the VAD operator unit 310 may comprises input/output (I/O) components (and related circuitry and/or support hardware), such as a display 312 and user controls 314, to enable user interactions. Further, the VAD operator unit 310 may comprise and/or be operable to utilize I/O components configured for providing indications relating to triggering of alerts and/or receiving feedback (e.g., confirmation) relating to such indications. For example, the VAD operator unit 310 may comprise a speaker (not shown), configured for providing audible indications of triggered alerts, a visual status indicator (e.g., LED) 318, configured for providing visual indication of triggered alerts, and a configuration button 316, configured to receive indication of user acknowledgment (e.g., by pressing the confirmation button 316), when alert indication(s) is/are outputted. The user controls 314 may comprise various types of user input elements, such as buttons, dials, etc. for allowing vehicle operator(s) or device users to provide input, such as to configure the VAD 300 and/or its operations, to respond to alerts (when triggered), etc. The user controls 314 may be implemented in the form of a touch screen (e.g., as part of the display 312), or be implemented with an alpha-numeric display. The display 312 (or any type of user interface) may be used to provide the vehicle operator with various information, such as alert related data (e.g., indicate the quantity of workers detected, and the approximate distance to the workers, calculated time till reaching the workers, etc.).

In some instances, rather than incorporating dedicated I/O components, the VAD 300 (or the VAD operator unit 310) may be operable to connect to and use existing I/O components (e.g., displays, speakers, etc.) in the vehicle, thus obviating the need to (and cost of) incorporating such dedicated components. For example, the VAD operator unit 310 may be operable to utilize existing audio systems to provide audible indication of triggered alerts.

The VAD antenna unit 320 may comprise one or more antennas 340 (and related circuitry and/or support hardware), configured for use in transmitting and/or receiving signals (e.g., broadcast alert related signals, receiving signal indicating triggering of alerts and/or confirmation of such alerts by workers, etc.). In some implementations, however, the VAD antenna unit 320 may not incorporate dedicated antennas, and may instead simply comprise connecting means (e.g., coaxial connectors for wiring) to existing and/or external antennas in the vehicle.

The VAD controller unit 330 may comprise suitable circuitry for performing (remaining) operations and/or functions of the VAD 300. The VAD controller unit 330 may comprise, for example, one or more main processors 350, a system memory 352, a communication subsystem 354, an input/output (I/O) subsystem 356, and a logging management component 358.

Each main processor 350 may comprise suitable circuitry operable to process data, and/or control and/or manage operations of the VAD 300, and/or tasks and/or applications performed therein. In this regard, the main processor 350 may configure and/or control operations of various components and/or subsystems of the VAD 300, by utilizing, for example, one or more control signals. The main processor 350 may comprise a general purpose processor (e.g., CPU), a special purpose processor (e.g., application-specific integrated circuit (ASIC)), or the like. The disclosure, however, is not limited to any particular type of processors. The main processor 350 may enable running and/or execution of applications, programs and/or code, which may be stored, for example, in the system memory 352. Alternatively, one or more dedicated application processors may be utilized for running and/or executing applications (or programs) in the VAD 300.

The system memory 352 may comprise suitable circuitry for permanent and/or non-permanent storage, buffering, and/or fetching of data, code and/or other information, which may be used, consumed and/or processed. In this regard, the system memory 352 may comprise different memory technologies, including, for example, read-only memory (ROM), random access memory (RAM), Flash memory, solid-state drive (SSD), and/or field-programmable gate array (FPGA). The disclosure, however, is not limited to any particular type of memory or storage devices. The system memory 352 may store, for example, configuration data, which may comprise parameters and/or code, comprising software and/or firmware, logging data, etc.

The communication subsystem 354 may comprise suitable circuitry operable to communicate signals from and/or to the electronic device, such as via one or more wired and/or wireless connections. In this regard, the communication subsystem 354 may be configured to support one or more wired or wireless interfaces, protocols, and/or standards, and to facilitate transmission and/or reception of signals to and/or from the VAD 300, and/or processing of transmitted and/or received signals, in accordance with the applicable interfaces, protocols, and/or standards. Examples of signal processing operations that may be performed by the communication subsystem 354 comprise, for example, filtering, amplification, analog-to-digital conversion and/or digital-to-analog conversion, up-conversion/down-conversion of baseband signals, encoding/decoding, encryption/decryption, and/or modulation/demodulation. For example, the communication subsystem 354 may be configured to support broadcast of alert related signals, via the antenna(s) 340.

The I/O subsystem 356 may comprise suitable circuitry for managing user interactions with the VAD 300, such as to enable obtaining input from and/or providing output to device user(s). The I/O subsystem 356 may support various types of inputs and/or outputs, including, for example, video, audio, tactile, and/or textual. In this regard, dedicated I/O devices and/or components, external to (and coupled with) or integrated within the VAD 300, may be utilized for inputting and/or outputting data during operations of the I/O subsystem 356. Examples of such dedicated I/O devices may comprise user interface components or devices (e.g., the display 312), audio I/O components (e.g., speakers and/or microphones), mice, keyboards, touch screens (or touchpads), and the like. In some instances, user input obtained via the I/O subsystem 356, may be used to configure and/or modify various functions of particular components or subsystems of the VAD 300.

The logging management component 358 may comprise suitable circuitry for managing logging operations in the VAD 300. The logging operations may comprise compiling log files (stored in the system memory 352) containing data relating to alerts, as described above.

Also, while not shown in FIG. 3, the VAD controller unit 330 may also comprise component for managing power supply (e.g., to the VAD controller unit 330 itself, and/or to other units, such as the VAD operator unit 310).

As noted above, as shown in the example implementation illustrated in FIG. 3, the VAD 300 may be implemented as multi-unit system, comprising multiple separate components (the VAD operator unit 310, the VAD antenna unit 320, and the VAD controller 330). In this regard, as noted each of the different physical unit may be configured for placement at particular location and/or position, selected for optimal performance with respect to functions and/or operations provided by that unit. For example, the VAD operator unit 310 may be configured for placement within the operator compartment (e.g., train cockpit) at position optimal for providing output to and/or receiving input from the operator (e.g., top of the dashboard). The VAD antenna unit 320, may be configured for placement outside (and on top) of the engine car. The VAD controller unit 330 may be configured for placement within the engine car, but out of the way (for convenience).

As the VAD controller unit 330 may house the bulk of the VAD resources (e.g., processing resources, storage resources, etc.), the VAD controller 330 may be configured to support connect to and/or communicate with the remaining unit(s) and/or available resources that may be utilized in support of operations of the VAD 300. For example, the VAD controller unit 330 may comprise data port 340, for enabling connecting to the VAD 300 for extracting data therefrom (e.g., log files) and/or inputting data thereto (e.g., for (re)configuration); a power connector 342 (e.g., drawing power from sources within the train); a VAD operator unit (VOU) connector 344; configured for connecting to the VAD operator unit 320 (e.g., to provide power thereto, exchange data therewith, etc.); one or more antenna connectors 346 (e.g., for connecting to the VAD antenna unit 320, existing antennas in the train, etc.); one or more GNSS connectors 348, for connecting to existing GNSS systems (or transceivers); etc.

Figure 4:
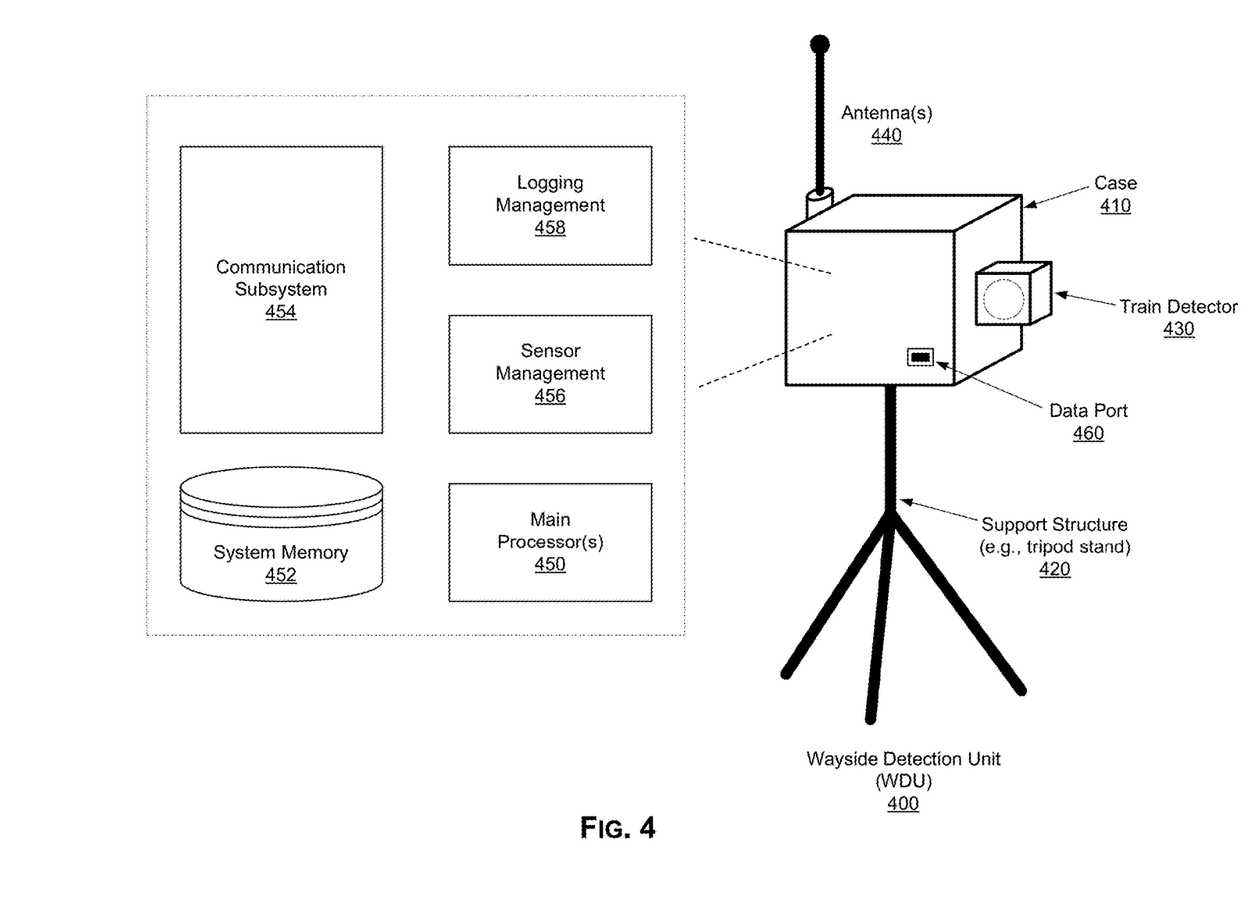
FIG. 4 illustrates an example wayside detection unit (WDU), in accordance with the present disclosure.

FIG. 4 illustrates an example wayside detection unit (WDU), in accordance with the present disclosure. Shown in FIG. 4 is a wayside detection unit (WDU) 400.

The WDU 400 may comprise suitable one or more of hardware (including circuitry and/or other hardware components), software, and combination thereof for implementing various aspects of the present disclosure, particularly with respect to the wayside detection and/or alert related functions in support of worker protection solutions. The WDU 400 may be a particular example implementation of the WDU 130, as described with respect to FIGS. 1A and 1B. In this regard, as noted above WDUs may be configured as portable (movable) devices that are placed along the expected path (e.g., train tracks) of vehicles that may pose safety threats to workers at particular locations. The WDU 400 is operable to perform such functions, in support of work protection systems in accordance with the present disclosure, as detecting approaching vehicles, triggering alerts at wearable devices (e.g., by broadcasting signals configured for interfacing with the wearable devices (e.g., PADs 100) to trigger the alerts thereby), and triggering critical alarms when a train enters a work area, as well as additional alert related functions, such logging alert related data, etc.

In the example implementation illustrated in FIG. 4, the WDU 400 may comprise a housing 410 for enclosing various components of the WDU 400 and/or allowing attachment to certain external elements or structures. The housing 410 may be constructed to be suitable for the intended operation environment and/or conditions of the WDU 400 (e.g., being constructed to be very rigid, to withstand accidental impacts during deployment and/or when it knocked down), and to withstand environmental conditions associated with outside/external use (e.g., rain, extreme cold/heat), etc.). The WDU 400 has one or more antennas 440, used in transmitting and/or receiving signals (e.g., broadcast alert related signals). Further, the WDU 400 may have sensory elements, such as a train detector 430. In this regard, the train detector 430 may be operable to monitor, detect, and track approaching vehicle, using one or more suitable technologies (e.g., visual, infrared, laser ranging, etc.), and/or to enable generating corresponding data (distance, relative speed, etc.). The WDU 400 typically would also comprise (or can be coupled to) a support structure 420, such as a rigid tripod, to enable placement of the WDU 400, such as near train tracks.

Internally, the WDU 400 may comprise suitable circuitry for performing various operations in support of its functions. For example, the WDU 400 may comprise one or more main processors 450, a system memory 452, a communication subsystem 454, a sensor management component 456, and a logging management component 458.

Each main processor 450 may comprise suitable circuitry operable to process data, and/or control and/or manage operations of the WDU 400, and/or tasks and/or applications performed therein. In this regard, the main processor 450 may configure and/or control operations of various components and/or subsystems of the WDU 400, by utilizing, for example, one or more control signals. The main processor 450 may comprise a general purpose processor (e.g., CPU), a special purpose processor (e.g., application-specific integrated circuit (ASIC)), or the like. The disclosure, however, is not limited to any particular type of processors. The main processor 450 may enable running and/or execution of applications, programs and/or code, which may be stored, for example, in the system memory 452. Alternatively, one or more dedicated application processors may be utilized for running and/or executing applications (or programs) in the WDU 400.

The system memory 452 may comprise suitable circuitry for permanent and/or non-permanent storage, buffering, and/or fetching of data, code and/or other information, which may be used, consumed and/or processed. In this regard, the system memory 452 may comprise different memory technologies, including, for example, read-only memory (ROM), random access memory (RAM), Flash memory, solid-state drive (SSD), and/or field-programmable gate array (FPGA). The disclosure, however, is not limited to any particular type of memory or storage devices. The system memory 452 may store, for example, configuration data, which may comprise parameters and/or code, comprising software and/or firmware, logging data, etc.

The communication subsystem 454 may comprise suitable circuitry operable to communicate signals from and/or to the electronic device, such as via one or more wired and/or wireless connections. In this regard, the communication subsystem 454 may be configured to support one or more wired or wireless interfaces, protocols, and/or standards, and to facilitate transmission and/or reception of signals to and/or from the WDU 400, and/or processing of transmitted and/or received signals, in accordance with the applicable interfaces, protocols, and/or standards. Examples of signal processing operations that may be performed by the communication subsystem 454 comprise, for example, filtering, amplification, analog-to-digital conversion and/or digital-to-analog conversion, up-conversion/down-conversion of baseband signals, encoding/decoding, encryption/decryption, and/or modulation/demodulation. For example, the communication subsystem 454 may be configured to support broadcast of alert related signals, via the antenna(s) 440.

The sensor management component 456 may comprise suitable circuitry for managing sensors, such as the train detector 430. For example, the sensor management component 456 may control the selection of detection and ranging technology implemented by the train detector 430, set the parameters required for its operations, and/or process information obtained via the train detector 430, to generate corresponding data (e.g., distance to approaching train, relative speed, etc.).

The logging management component 458 may comprise suitable circuitry for managing logging operations in the WDU 400. The logging operations may comprise compiling log files (stored in the system memory 452) containing data relating to alerts, as described above.

The WDU 400 may comprise a data port 460 for extracting data (e.g., log files) from and/or inputting data (e.g., (re)configuration data) into the WDU 400.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

Accordingly, various embodiments in accordance with the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

Various embodiments in accordance with the present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system for worker protection, the system comprises:
a compact wearable personal alert device, configured for use by a worker, the personal alert device comprising:
a housing for enclosing components of the personal alert device;
an attachment structure for attaching the personal alert device to the worker or an item used by the worker;
a power supply for powering components of the personal alert device;
a communication component, comprising one or more antennas, configured for transmitting and/or receiving wireless signals;
one or more indicator components, for outputting alert indications; and
one or more circuits operable to process signals and data, and to perform one or more applications or functions relating to operations of the personal alert device;
wherein the personal alert device is operable to:
process signals received from a companion alert device, wherein the companion alert device is deployed locally in proximity of the personal alert device and/or within vehicles operating in areas service by workers;
generate, in response to signals received from the companion alert device, a safety alert; and
output, via the one or more indicator components, one or more alert indications to the worker based on the safety alert.

2. The system of claim 1, wherein the personal alert device is operable to implement a power management scheme for optimizing power consumption in the personal alert device.

3. The system of claim 2, wherein the power management scheme comprises transitioning the personal alert device from a full operation mode to a power-saving mode, the power-saving mode comprising at least one of shut-down mode and low-function mode.

4. The system of claim 2, wherein the personal alert device comprises at least one control component for generating control data applicable to the power management scheme.

5. The system of claim 4, wherein the at least one control component comprises a movement sensor for sensing movement of the worker, configured to generate indications when the personal alert device is moving or not.

6. The system of claim 1, wherein the one or more antennas comprise diversity antennas of identical or differing polarity, and the personal alert device is operable to support use of diversity during the transmitting and/or receiving of wireless signals.

7. The system of claim 1, wherein triggering of alerts and/or broadcast of signals triggering of the alerts is based on one or more types of alert thresholds.

8. The system of claim 7, where the one or more types of alert thresholds comprise time-to-arrival (TTA), distance-from-train (DFT), and low-speed close proximity distance alert (CPD).

9. The system of claim 1, wherein the personal alert device is operable to communicate with one or more nearby alert devices, to forward received signals and/or alerts generated in response to the received signals among the personal alert device and the one or more nearby alert devices.

10. The system of claim 1, wherein the personal alert device is operable to log data relating to alerts triggered and/or handled by the personal alert device.

11. The system of claim 1, wherein the companion alert device comprises a vehicle-mounted alert device, a wayside detection unit, or another personal alert device.

12. The system of claim 1, wherein the one or more indicator components comprise at least one of visual indicator, audio indicator, and a tactile indicator.

13. The system of claim 1, wherein the power supply comprises a rechargeable power supply.

14. The system of claim 13, wherein the rechargeable power supply is operable to recharge without direct connection.

15. The system of claim 1, wherein the attachment structure comprises a clip structure or a strap structure.

16. The system of claim 1, wherein the personal alert device comprises one or more acknowledgment components, configured for receiving input from the worker, to indicate acknowledgment of the safety alert.

17. The system of claim 16, wherein the personal alert device is operable to communicate a signal to the companion alert device to indicate the acknowledgment of the safety alert by the worker.

18. The system of claim 1, wherein the housing completely seals internal space enclosing components of the personal alert device, and wherein charging the power supply and/or communication of data to and/or from the portable alert device is done without direct connection.

19. The system of claim 1, wherein the personal alert device is operable to implement configurable alarm management for allowing setting and/or adjusting of rules controlling triggering and/or handling of alerts.

20. The system of claim 1, wherein the personal alert device is operable to:
receive Global Navigation Satellite System (GNSS) signals;
determine location information based on the received GNSS signals; and
utilize the location information in conjunction with at least one of the operations of the personal alert device.

21. A system for worker protection, the system comprises:
a vehicle-mounted alert device, configured for use on a vehicle, the vehicle-mounted alert device comprising:
 a housing for enclosing components of the vehicle-mounted alert device;
 a communication component, comprising one or more antennas, configured for transmitting and/or receiving wireless signals;
 one or more circuits operable to process signals and data, and to perform one or more applications or functions relating to operations of the vehicle-mounted alert device; and
 one or more input/output (I/O) components, for receiving input from an operator of the vehicle and/or for providing output to the operator of the vehicle;
 wherein the vehicle-mounted alert device is operable to:
  broadcast alert triggering signals; and
  generate, in response to triggering of alerts, data relating to alerts and/or to other devices or objects in path of the vehicle; and
  output based on the data, via the one or more I/O components, feedback information to the operator.

22. The system of claim 21, wherein the vehicle-mounted alert device is configured, at least in part, as portable, detachable and movable from the vehicle.

23. The system of claim 21, wherein the vehicle-mounted alert device is operable to log data relating to alerts triggered in response to movement of the vehicle.

24. The system of claim 21, wherein the vehicle-mounted alert device is arranged into a plurality of separate physical units that comprises at least a broadcast unit comprising at least the communication component, the broadcast unit is configured to attachment external to the vehicle.

25. The system of claim 24, wherein the plurality of separate physical units comprises an operator unit comprising at least the one or more I/O components, the operator unit is configured for use by the operator.

26. The system of claim 21, wherein the vehicle-mounted alert device is operable to:
receive a signal indicating an acknowledgment of a safety alert by a worker in response to the broadcasted alert triggering signals; and
provide, via the one or more I/O components, an indication of the acknowledgement to the operator of the vehicle.

27. A system for worker protection, the system comprises:
a wayside detection unit, configured for placement on or near path of a vehicle, the wayside detection unit comprising:
 a housing for enclosing components of the wayside detection unit;
 a support structure for holding and supporting the wayside detection unit when placed on or near the path;
 a power supply for powering components of the wayside detection unit;
 one or more sensory components, for detecting, monitoring, and/or tracking vehicles;
 a communication component, comprising one or more antennas, configured for transmitting and/or receiving wireless signals;
 one or more circuits operable to process signals and data, and to perform one or more applications or functions relating to operations of the wayside detection unit;
 wherein the wayside detection unit is operable to:
  determine, based on sensory data obtained from the one or more sensors, when the vehicle is approaching the wayside detection unit; and
  broadcast, to one or more companion alert devices, alert related signals, relating to the approaching of the vehicle.

28. The system of claim 27, wherein the wayside detection unit is operable to forward alerts and/or alert related signals communicated by one or more nearby alert devices, the one or more nearby alert devices comprises vehicle alert devices, personal alert devices and/or other wayside detection units.

29. The system of claim 27, wherein the wayside detection unit is operable to log data relating to alerts triggered in response to the broadcasted alert related signals.

30. The system of claim 27, wherein the support structure comprises a tripod or a connection element for permanent connection to wayside equipment.

\* \* \* \* \*